Dec. 26, 1939.  E. H. LAND ET AL  2,184,999
LIGHT FILTER
Filed Feb. 24, 1938  4 Sheets—Sheet 1
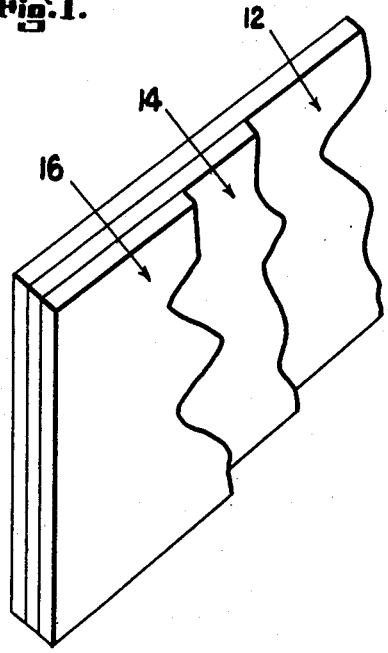
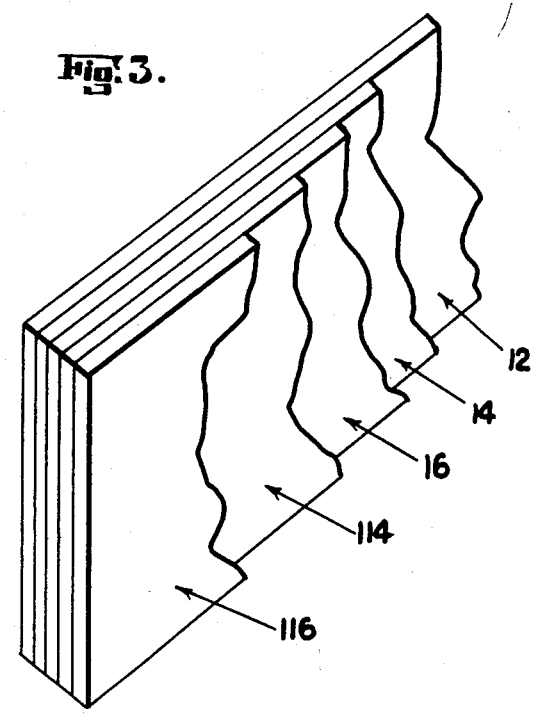
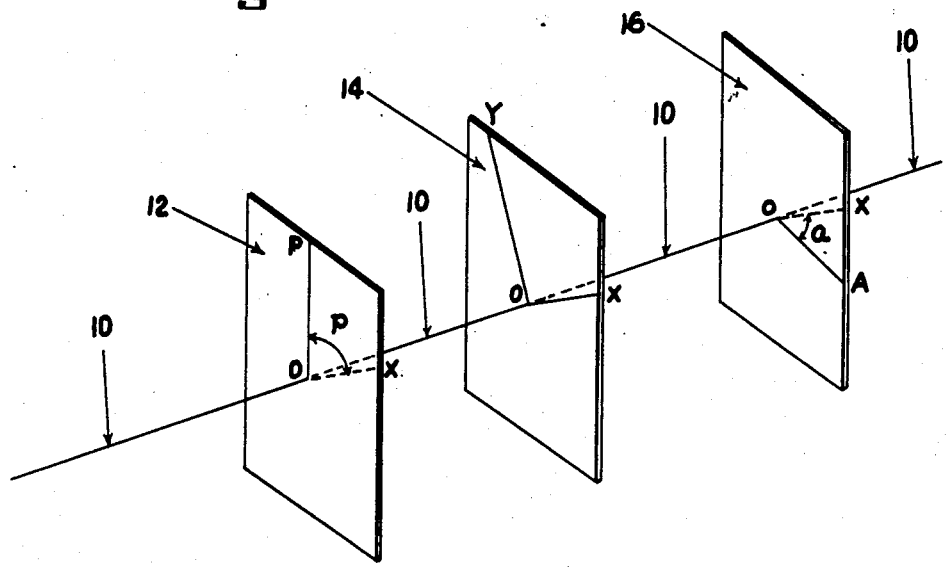

Dec. 26, 1939.  E. H. LAND ET AL  2,184,999
LIGHT FILTER
Filed Feb. 24, 1938   4 Sheets-Sheet 2

INVENTORS
Edwin H. Land and
Martin Grabau
BY
Brown & Jones
ATTORNEYS

Dec. 26, 1939.  E. H. LAND ET AL  2,184,999
LIGHT FILTER
Filed Feb. 24, 1938  4 Sheets-Sheet 3

INVENTORS
Edwin H. Land and
Martin Grabau
BY
Brown & Jones
ATTORNEYS

Dec. 26, 1939.  E. H. LAND ET AL  2,184,999
LIGHT FILTER
Filed Feb. 24, 1938  4 Sheets-Sheet 4

INVENTORS
Edwin H. Land
and
Martin Grabau
BY
Brown & Jones
ATTORNEYS

Patented Dec. 26, 1939

2,184,999

UNITED STATES PATENT OFFICE 2,184,999

LIGHT FILTER

Edwin H. Land, Wellesley Farms, and Martin Grabau, Cambridge, Mass., assignors, by mesne assignments, to Polaroid Corporation, Dover, Del., a corporation of Delaware Application February 24, 1938, Serial No. 192,220

7 Claims. (Cl. 88—65)

This invention relates to light filters and to a method of making the same, and more specifically to light filters which utilize the phenomena of polarization of light.

In general, it is an object of this invention to provide a device of the character described, which will efficiently perform the purposes for which it is intended, which is simple and economical of construction, which can be expeditiously, conveniently and safely manipulated, and which can be readily manufactured and assembled.

Another object of the invention is to provide a method of constructing a filter whereby one or more predetermined portions of a light spectrum may be transmitted; to provide such a method whereby the relative intensities of predetermined portions of a continuous, line or band spectrum may be predeterminedly controlled; to provide such a filter in sheet form.

Other objects of the invention will in part be obvious and will in part appear hereinafter.

The invention accordingly comprises the several steps and the relation of one or more of such steps with respect to each of the others, and the article possessing the features, properties, and the relation of elements, which are exemplified in the following detailed disclosure, and the scope of the applications of which will be indicated in the claims.

For a fuller understanding of the nature and objects of the invention, reference should be had to the following detailed description, taken in connection with the accompanying drawings, in which:

Figure 1 is a diagrammatic view in perspective with parts broken away showing a structure embodying one form of the invention;

Figure 2 is a diagrammatic, exploded view of the elements of the device shown in Figure 1, with indicia thereon to aid in an explanation of the operation of the device;

Figure 3 is a view similar to Figure 1 of a further modification of the invention;

In Figure 1 of the drawings, there is shown a laminated structure representing a filter. 12 denotes a polarizing layer, preferably of the material sold under the trade name "Polaroid." It is a sheetlike element comprising a set medium in which are fixedly suspended a plurality of polarizing particles having their polarizing axes aligned. 16 denotes a similar element parallel to and spaced from the element 12. Between these elements there is placed a doubly-refracting retardation plate (for example, a half wave plate) 14. The retardation plate may be of doubly-refracting material such as mica, Cellophane or other cellulosic material possessing the desired properties, sections of natural crystals, etc. Elements 12, 14 and 16 may be spaced from each other, but they are preferably in juxtaposition so as to give a unitary sheet-like device.

It is intended that Figure 1 represent a filter which does not transmit as much as the blue light which it receives from an incident beam of white light as it transmits of other parts of the visible spectrum. Such a filter may be used to compensate for the non-uniformity of sensitivity of the ordinary photographic emulsion. In general, the polarizing axes of the polarizing polarizer 12 and the polarizing analyzer 16 may have predetermined relative orientation. In this photographic filter, however, it is preferred that the polarizing axes (hereinafter referred to as "axes") of the polarizer and analyzer shall be at right angles to each other.

The half wave plate is one which introduces a relative difference of phase of exactly a half period between the two components of polarized light traversing it when the wavelength of the light is 7000 Å. The principal directions of vibration of light in the half wave plate are preferably oriented at 45° with respect to the axes of the polarizer and analyzer.

Figure 4:
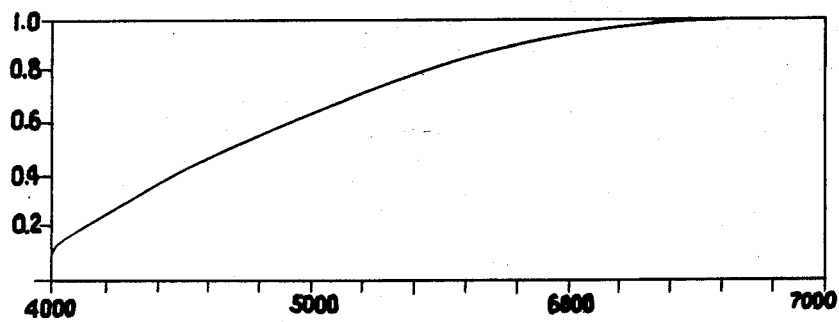
Figure 4 is a curve showing the spectral distribution of transmission for a device such as that shown in Figure 1 employing a half-wave plate calculated for the wavelength 7000 A.

With the elements named in the positions described, there will be a maximum transmission of light when its wavelength is 7000 Å. Since a retardation plate which introduces a relative difference of phase of a half period at the wavelength 7000 Å. introduces different relative retardations at other wavelengths, light of those other wavelengths (in the visible spectrum) is not transmitted through the entire device in the same proportion of its original incident intensity as is light of 7000 Å. In fact, as is shown in Figure 4, the percentage of light transmitted decreases for the succeeding wavelengths in the spectrum from 7000 Å., at approximately the "red" end of the visible spectrum, down to 4000 Å., which latter wavelength usually defines the "blue" end of the visible spectrum. The transmission of this blue light of wavelength 4000 Å is relatively only about 15 per cent of the transmission of red light of wavelength 7000 Å. The graph of the relative transmission of light between the two mentioned extremes of the visible spectrum is a slightly curved continuous line.

Actually, the transmission curve here described is only a part of a curve which has a maximum at 7000 Å. and which decreases again at wavelengths greater than 7000 Å. in the infra-red. In a related manner the curve also extends into the region of ultra-violet light.

The ratios of the intensities of the various wavelength components of the transmitted light to those of the corresponding components of the incident light may be varied by using retardation plates which retard by amounts other than a half period and which retard by some exactly predetermined amount for some wavelength, not necessarily 7000 Å. For example, if a half wave plate is used which introduces a relative retardation of a half period for light of wavelength 6500 Å., the transmission curve obtained shows that light of wavelength 6500 Å. is transmitted more than any other visible wavelength, and that blue light of wavelength 4000 Å. undergoes a relative transmission of about 33 per cent. The effect therefore of using the last-mentioned plate rather than the first is to move the maximum of the transmission curve toward the "blue" end of the spectrum.

The sheets of the filter may have as large an area as desired and a light source may be provided to give parallel light incident perpendicularly over the entire surface of the polarizer sheet.

The following analysis is provided as what is believed to be the description of the transmission of light by such a filter unit based on the undulatory theory of light. Figure 2 shows a diagrammatic representation of possible directions of vibration of light in the several elements constituting the filter. The direction of travel of the beam of light is perpendicular to the plane of the elements 12, 14 and 16, and it is indicated by the line 10. The line OP in 12 identifies the orientation of the polarizing axis of the polarizer. In like manner, the line OA in 16 identifies the orientation of the polarizing axis of the analyzer. The lines IX and OY in 14 identify the mutually perpendicular principal directions of vibration of light in the plane of the retardation plate. For the sake of convenience, the direction OX is also indicated in 12 and 16.

In 12, the line OP is inclined to OX by the angle $p$; and in 16, the line OA is inclined to OX by the angle $a$. For the immediate purposes of this analysis, neither the angle $p$ nor the angle $a$ is equal either to zero or to 90°. It is also assumed that the incident beam of light 10 is unpolarized.

After the incident beam of unpolarized light has traversed the polarizer 12, it emerges from that polarizer in a plane polarized state in which the direction of (say) the electric vector is given by the direction OP. This beam of plane polarized light emerging from the polarizer 12 can be described mathematically by the expression $H \sin mt$ where H is its amplitude, $t$ denotes time, and $m$ is a quantity equal to the frequency of the light vibration multiplied by $2\pi$. For the sake of convenience, the polarizer 12 is assumed to be a perfect polarizer, so that the intensity of the plane polarized beam is one half the intensity of the incident unpolarized light.

On entering the retardation plate 14, this plane polarized vibration is resolved along the two principal directions of vibration OX and OY. Immediately inside the first surface of the retardation plate, the component of the vibration in the direction OX may be written $H \cos p \sin mt$ and the other component in the direction OY is described by $H \sin p \sin mt$.

As these two plane polarized vibrations proceed through the retardation plate, the optical character of the plate gives rise to a difference of phase between the two vibrations. This difference of phase depends upon the two indices of refraction of the plate, its thickness, and the wavelength of light. It is therefore necessary to consider this alalysis restricted to light of such a narrow interval of wavelength in the spectrum that it may effectively be characterized by a single wavelength.

If $d$ (expressed in radians) is the difference of phase between the two vibrations emerging from the retardation plate, these vibrations may be described by the expressions $H \cos p \sin mt$     (in the direction OX)
$H \sin p \sin (mt+d)$   (in the direction OY)

The analyzer 16 transmits vibrations lying in the direction OA only. Each of the two mutually perpendicular vibrations emerging from the retardation plate 14 will contribute a component to the vibration that is transmitted by the analyzer 16. The contribution from the vibration in the direction OX to the direction OA is described by the expression $H \cos p \cos a \sin mt$ and the contribution to the vibration along OA from the component along OY, in like manner, may be written $H \sin p \sin a \sin (mt+d)$.

The vibration in the direction OA transmitted by the analyzer 16 is the sum of these two expressions, i. e.

$$H (\cos p \cos a \sin mt + \sin p \sin a \sin (mt+d))$$

For the sake of convenience, this expression will hereinafter be referred to by the symbol $(z)$.

Each of the two undulatory terms in the expression $(z)$ has the periodicity defined by the quantity $m$. The resultant of these two terms must therefore have the same periodicity. In order to calculate the intensity of the light implied by the expression $(z)$, it is necessary to transform $(z)$ algebraically so that its amplitude and time argument functions are expressed explicity.

When this indicated algebraic transformation is performed, the resultant amplitude of the expression (z) is found to be the square root of $$H^2(\cos^2 p \cos^2 a + \sin^2 p \sin^2 a + 2 \sin p \cos p \sin a \cos a \cos d)$$

For the sake of convenience, this expression will hereinafter be referred to by the symbol $(i)$.

If, as is usually done, the intensity of a given beam of light is defined as the square of its amplitude, the expression $(i)$ above gives the intensity of light identified with the expression $(z)$.

By writing $$\left(1 - 2\sin^2 \frac{d}{2}\right)$$

for $\cos d$, the expression $(i)$ may be transformed into $$H^2\left((\cos p \cos a + \sin p \sin a)^2 - 4 \sin p \cos p \sin a \cos a \sin^2 \frac{d}{2}\right)$$

which is immediately reduced to $$H^2\left(\cos^2(p-a) - \sin 2p \sin 2a \sin^2 \frac{d}{2}\right)$$

The quantity $H^2$ is the intensity of the plane polarized beam of light emerging from the polarizer 12. But this intensity is one half the intensity of the incident beam of unpolarized light. Consequently, if the intensity of the incident unpolarized light (at a given wavelength) is taken as the standard of reference, the relative intensity of light of the given wavelength transmitted by the filter is equal to $$J = \frac{1}{2}\left(\cos^2(p-a) - \sin 2p \sin 2a \sin^2 \frac{d}{2}\right)$$

If, as in the case of the photographic filter previously described, the axes of the polarizer 12 and the analyzer 16 are at right angles to each other and, at the same time, at 45° to the principal directions of vibration of the retardation plate 14, $(p-a)$ equals 90° and $\cos(p-a)$ equals zero. At the same time, both $\sin 2p$ and $\sin 2a$ are equal to unity. The relative intensity of the transmitted light, for the given wavelength, then becomes $$J = \frac{1}{2} \sin^2 \frac{d}{2}$$

The difference of phase $d$ introduced by a given retardation plate is calculated from the relation $$d = \frac{2\pi}{\lambda}(n_1 - n_2)D$$

where $\lambda$ is the wavelength of light, $n_1$ and $n_2$ are the indices of refraction of the retardation plate, and $D$ is the thickness of the plate. When the quantities $D$ and $\lambda$ are expressed in the same units of length, the retardation $d$ will be expressed in radian measure.

A retardation plate will be a half wave plate for a given wavelength $\lambda$ when $d$ is equal to $\pi$. The thickness of the half wave plate is then given by $$\frac{\lambda}{2(n_1 - n_2)}$$

If the plate were twice as thick, it would be a whole wave plate for the wavelength used in the formula. Similarly, there are 3/2, 5/2, or any other fractional wave plate for any particular wavelength. For materials of moderate birefringence, the quantity $(n_1 - n_2)$ may be treated as being substantially constant, independent of wavelength.

The relative intensity of light of wavelength $\lambda$ transmitted by the filter previously described may then be written $$I_\lambda = \frac{1}{2}\sin^2 \frac{\pi}{\lambda}(n_1 - n_2)D$$

This expression for $I_\lambda$ is a mathematical statement of the fact that the device in Figure 1 transmits light of certain wavelengths in maximum amount and light of certain other wavelengths in minimum amount. A graph of the intensity of the transmitted light, plotted as a function of wavelength, for a filter involving a given retardation plate, exhibits a series of maxima and minima which lie progressively closer together as the curve proceeds toward the shorter wavelengths. Observed data are in substantial agreement with the graph of the quantity $I_\lambda$. In any given broad interval of wavelengths, such as the entire visible spectrum, the maxima and minima are more numerous and closer together for a large value of $D$ than for a smaller one.

Compound filters may be devised in which the light traverses two or more filter units of the type just described in succession. The analyzing polarizer of any one unit may be used as the polarizing polarizer of the next succeeding unit. If such a compound filter is interposed in the path of a beam of white light (comprising components of substantially all wavelengths of the visible spectrum in their proper proportions), the first unit will yield maximal transmission for certain wavelengths of light. At the same time, its transmission for certain other wavelengths will be a minimum. The next unit acts upon the light it receives from the first unit. If each unit in the compound filter allows a maximum (or large) transmission for light of a particular wavelength, then light of that wavelength is transmitted by the compound filter with a maximum (or large) relative intensity, compared to its original intensity in the incident beam. If, however, any one unit exhibits a minimum (or small) transmission at a particular wavelength, the device as a whole also transmits that light with a minimum (or small) relative intensity. In other words, the latter wavelength is filtered out.

If, for example, in Figure 3 the retardation plate 14 is of such a nature that it introduces a relative phase retardation of 19/2 periods for light of wavelength 5500 Å., the first unit transmits a relatively large percentage (nearly a maximum) of light at 5461 Å. which is the wavelength of the strong green line in the spectrum of mercury. This first unit transmits the other principal lines in the spectrum of mercury with greater or lesser relative intensity.

Plate 114, which is designed to yield a retardation of 25/2 periods at 5500 Å., forms with the polarizing elements 16 and 116 a second unit which also exhibits maximum transmission in the neighborhood of 5461 Å. The other maxima in the spectral distribution of transmission of the second unit do not coincide with other maxima in the transmission of the first unit anywhere in the visible spectrum where there is a mercury line of any strength.

Figure 5:
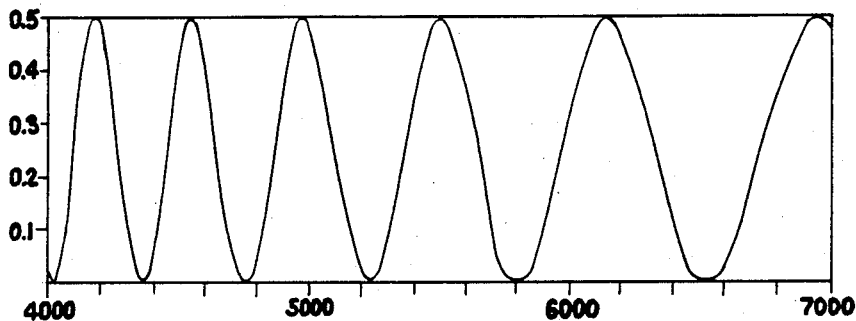
Figure 5 is a curve showing the spectral distribution of transmission for a device such as that shown in Figure 1 employing a 19/2 wave plate calculated for the wavelength 5500 A.
Figure 6:
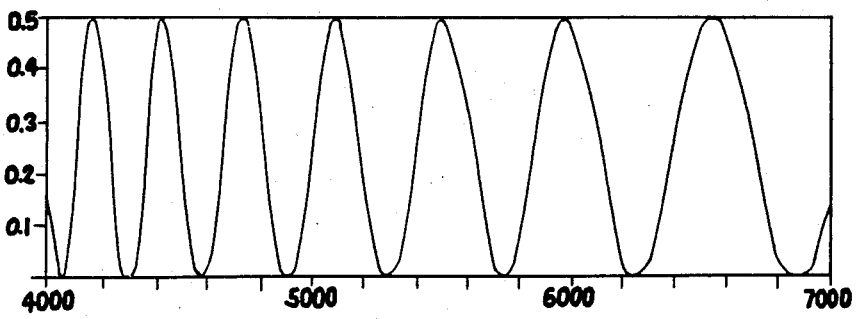
Figure 6 is a similar curve for a 25/2 wave plate.
Figure 7:
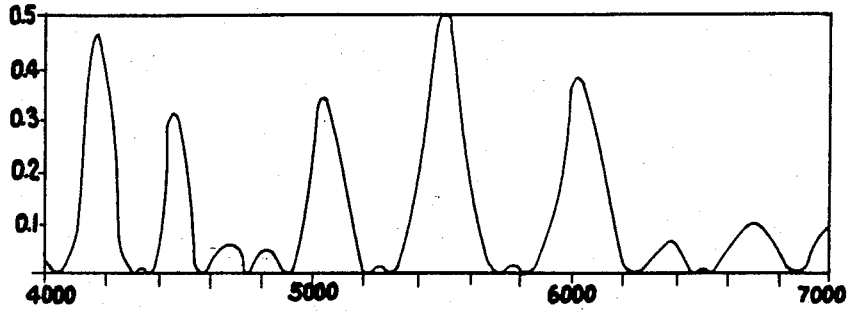
Figure 7 is a curve showing the spectral distribution of transmission for the combination of the two units illustrated by the curves of Figures 5 and 6 and showing in connection therewith a schematic representation of the line spectrum of a mercury vapor lamp.

This effect is best illustrated by the curves showing the spectral distribution of transmission of the two units separately and combined. Figure 5 shows the spectral distribution of transmission of visible white light by the first unit, which involves a 19/2 wave plate for the wavelength 5500 Å. Figure 6 is a similar curve for the second unit, using a 25/2 wave plate for the same wavelength. Figure 7 represents the spectral distribution of transmission of the two units in combination, being twice the product of the curves in Figures 5 and 6. In the lower part of Figure 7 there are shown the principal lines in the visible spectrum of mercury, the heights of the lines in the diagram being roughly indicative of the relative intensities of the corresponding spectrum lines in the light of a common mercury arc. It is seen at once from this diagram that the compound unit is substantially opaque to all the principal lines in the visible part of the spectrum of mercury, except the strong green line at 5461 Å. This compound filter is therefore a device which will isolate the green line. An ordinary mercury arc in combination with such a filter is thus converted into a source of substantially monochromatic light.

For light of any narrow wavelength interval defined by the wavelength λ, the transmission of a compound filter is equal to the product of the several coefficients of transmission (at the wavelength λ) of the constituent unit filters. If, in Figure 3, the plate 14 has a thickness $D_1$ and plate 114 is of the same material cut in the same plane and has a thickness $D_2$, the relative intensity of light of wavelength λ transmitted by the entire device is given by the expression $$\frac{1}{2} \sin^2 \frac{\pi}{\lambda}(n_1 - n_2)D_1 \sin^2 \frac{\pi}{\lambda}(n_1 - n_2)D_2$$

By evaluating this expression for a sufficient number of wavelengths in the spectrum, the spectral distribution of transmission of the compound filter is determined. Results thus calculated are confirmed by experiment.

For compound filters comprising a larger number of constituent units, the transmission is calculated by a suitable generalization of the above expression which embodies a continued product of suitable terms. For instance, if the number of units in the compound filter is equal to $s$, the expression takes the mathematical form $$\frac{1}{2} \sin^2 \frac{\pi}{\lambda}(n_1 - n_2)D_1 \sin^2 \frac{\pi}{\lambda}(n_1 - n_2)D_2$$

$$\sin^2 \frac{\pi}{\lambda}(n_1 - n_2)D_3 \ldots \sin^2 \frac{\pi}{\lambda}(n_1 - n_2)D_s$$

The calculation of these formulae has disregarded the loss of light due to surface reflection and ordinary absorption; and no account has been taken of the slight defects of polarization in the action of the polarizing media. These factors in no wise interfere with the practicability of the devices.

These formulae imply that (1) the polarizing means in the filters are so oriented that the polarizing axes of successive polarizers are at right angles to each other, and (2) the intercalated retardation plates are all so oriented that their principal directions of vibration are at 45° to the axes of the polarizers. These restrictions are not necessary. In certain cases it may be desirable to orient the polarizers and retardation plates at certain angles different from those specified for the simple cases hitherto described. All such arrangements are deemed to fall within the scope of this invention. By suitable choices of the number of units in a compound filter, the retardations of the several retardation plates, and the orientations of the several polarizers and retardation plates relative to one another, it is possible to obtain many desired spectral distributions of transmission.

As another example of a compound filter comprising two units there is a filter whose spectral distribution of transmission is substantially identical to the spectral distribution of relative sensitivity of the human eye. Such a filter is useful in photography and in illuminating engineering.

Figure 8:
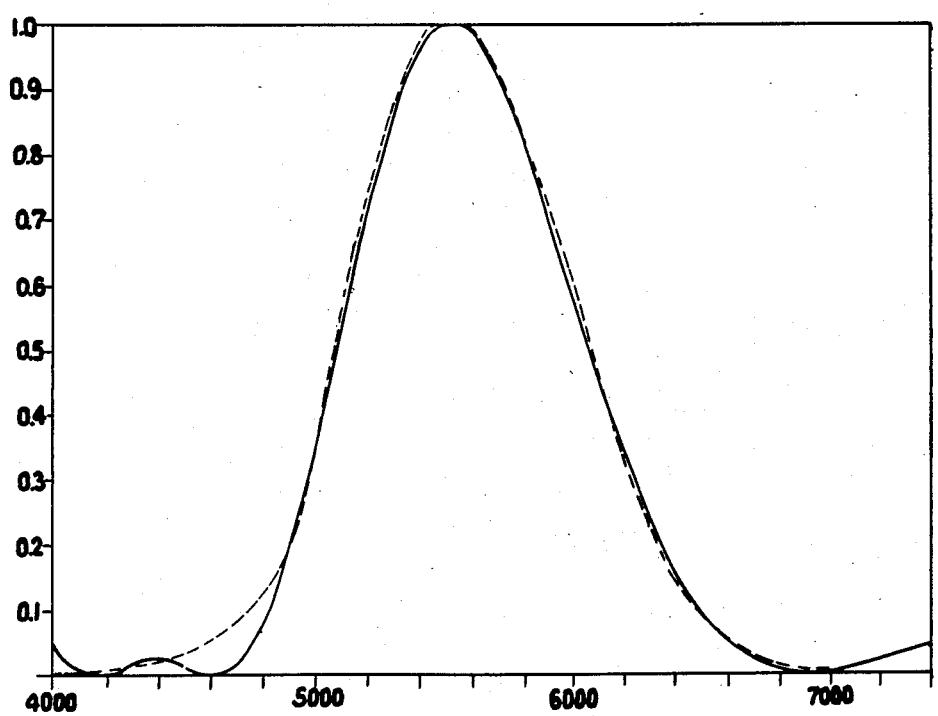
Figure 8 is a curve showing the spectral distribution of transmission of a filter embodying one form of the invention employing a 3/2 and a 5/2 wave plate for the wavelength 5540 A. plotted together with the visibility curve of the human eye, as taken from the Handbook of Chemistry and Physics (Chemical Rubber Publishing Co.)

The two retardation plates in this filter are a 3/2 and a 5/2 wave plate for the wavelength 5540 Å. As before, the axes of successive polarizers are crossed; and the principal directions of vibration of the retardation plates are again at 45° to the directions of the axes of the several polarizers. The spectral distribution of transmission of this filter is plotted in Figure 8, wherein the solid line represents the spectral distribution of transmission of the filter described and the dotted line represents the visibility curve of the human eye.

The present invention contemplates and includes within its scope monochromators. Multiple unit devices, in certain forms thereof, fall within this class of instruments. Quadruple systems, for example, involving four retardation plates and five polarizers provide filters whose transmission is concentrated within a fairly narrow band of wavelengths. The transmission of such filters in other parts of the visible spectrum occurs only in isolated regions and never exceeds ten per cent of the transmission in the desired band.

A system of this kind may be formed with a combination of 11/2, 15/2, 21/2, and 29/2 wave plates—all calculated for the same wavelength. Such a device is shown in perspective in Fig. 10 with parts broken away for clarity. The monochromator comprising the polarizing elements 120 and the fractional wave plates 122 is shown mounted for rotation in the path of a beam of light in a manner hereinafter explained in greater detail in connection with the device illustrated in Fig. 9. As before, the polarizers 120 in the pile are successively crossed; and the principal directions of vibration of the retardation plates 122 are inclined at 45° to these polarizing axes. This type of filter will show a spectral distribution curve having a single high peak. A single combination of these respective orders of interferences serves anywhere in the spectrum. The wavelength of the transmitted light increases when the retardation of each of the retardation plates is increased in the same proportion. If, for instance, a filter is to be used within the interval between the wavelengths $\lambda_1$ and $\lambda_2$, where $\lambda_1$ is less than $\lambda_2$, it may be designed to transmit a band at $\lambda_1$ when the plates are set for normal incidence. By tipping all the retardation plates simultaneously through the same angle, independently of the polarizers, their retardations are changed in the same proportion, provided the plates are properly cut with respect to the angular distribution of their birefringence. The transmitted band in the spectrum then moves toward the longer wavelength $\lambda_2$.

If the device is in the preferred form with the several polarizers and retardation plates laminated together into a single sheet, it is desirable that the axis about which the sheet is to be tipped shall be parallel or perpendicular to the polarizing axis of one of the polarizing elements.

Figure 9:
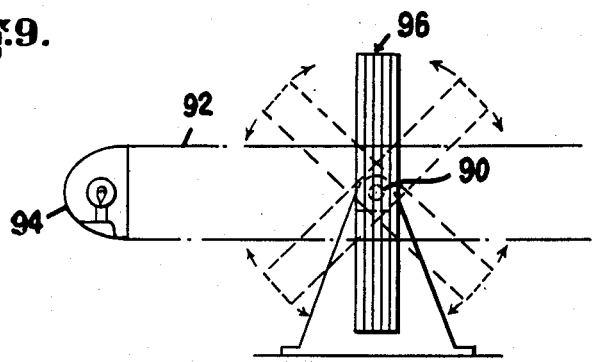
Figure 9 is a somewhat diagrammatic representation of a device embodying one form of the invention mounted for rotation in the path of a beam of light emanating from a suitable source of light.
Figure 10:
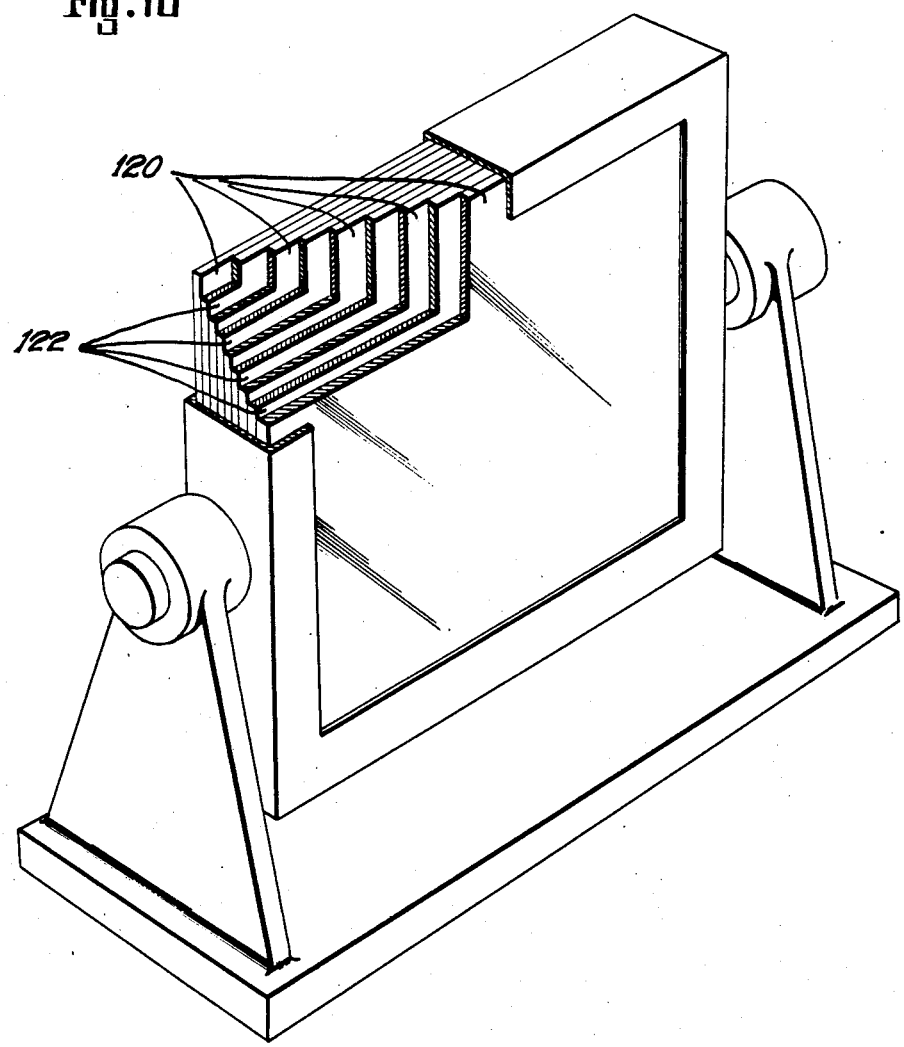
Fig. 10 is a view in perspective with parts broken away of a still further modification of the invention mounted for rotation as is the device shown in Fig. 9.

In Figure 9 there is shown a filter of the type described heretofore mounted as at 90 for rotation in the path of a parallel beam of light 92 emanating from a suitable source of light 94. It is understood that the filter shown generally as at 96 may comprise any desired number of polarizing elements and wave retardation plates laminated together in the manner heretofore described with the axis of rotation 90 coinciding substantially with the polarizing axis of at least one of the polarizing elements, or being substantially at right angles thereto. It will be apparent that such a device is admirably adapted for use as a color filter adapted to impart to the projected beam varying color as the filter itself is rotated about the axis 90 in the path of the beam.

It will be obvious that other means of mounting the filter for rotation in the path of the beam may be employed, and that if desired the polarizing elements may be fixedly positioned and the wave retardation elements may be mounted for rotation together as a unit in the path of the beam of light. Such a structure necessitates the spacing of the various elements of the combination. The type of structure shown in Figure 9 is deemed preferable.

Throughout the specification and claims it is to be understood that the expression "birefringent" is deemed to describe ordinary doubly refracting media by which an incident beam of plane polarized light is ordinarily divided into two plane polarized beams vibrating in directions at right angles to each other, these directions being the socalled principal directions of vibration. Such media are to be distinguished from socalled optically active media whose optical behavior may be described by supposing that an incident beam of plane polarized light is divided into two circularly polarized components whose light vectors are rotating in opposite directions.

It is also to be understood that the expression "retardation" of a birefringent retardation plate refers to the difference of phase between the two components of plane polarized light vibrating along the mutually perpendicular principal planes of vibration of the retardation plate as they emerge from said plate, the light incident on the plate being parallel light impinging on the plate normally and being plane polarized in a direction nonparallel to either of the principal directions of vibration of said retardation plate.

Since certain changes in carrying out the above process and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

Having described our invention, what we claim as new and desire to secure by Letters Patent is:

1. A light filter comprising at least three sheet-like light polarizing elements and at least two birefringent retardation plates so positioned that polarizing elements and retardation plates alternate in said filter, the intermediate polarizing element having its polarizing axis substantially perpendicular to the polarizing axes of the first and third polarizing elements, the principal directions of vibration of each said birefringent plate substantially bisecting the angle formed by the polarizing axes of the polarizing elements thereadjacent, said retardation plates showing different retardations for light of a predetermined wave length, all of said polarizing elements and birefringent plates being positioned to intercept the same incident beam of light and being assembled to form a unitary structure.

2. A light filter comprising at least three sheet-like light polarizing elements and at least two birefringent retardation plates so positioned that polarizing elements and retardation plates alternate in said filter, the intermediate polarizing element having its polarizing axis substantially perpendicular to the polarizing axes of the first and third polarizing elements, the principal directions of vibration of each said birefringent plate substantially bisecting the angle formed by the polarizing axes of the polarizing elements thereadjacent, said retardation plates showing different retardations for light of a predetermined wave length, and means to mount said filter for rotation about an axis intersecting the direction of propagation of light transmitted by the filter, said axis of rotation coinciding with the polarizing axis of at least one of said polarizing elements.

3. A light filter comprising successively a sheet-like light polarizing element, a 3/2 wave retardation plate for the wavelength 5540 Å, a second sheet-like light polarizing element positioned with its polarizing axis at right angles to that of the first mentioned polarizing element, a 5/2 wave retardation plate for the wavelength 5540 Å, and a third sheet-like light polarizing element positioned with its polarizing axis parallel to the axis of said first mentioned polarizing element, the principal directions of vibration of each retardation plate being approximately at 45° to the axes of said polarizing elements, said light-polarizing elements and retardation plates being positioned to overlie each other and to intercept and transmit the same incident beam of light.

4. A light filter comprising successively a sheet-like light polarizing element, a 19/2 wave retardation plate for the wavelength 5500 Å, a second sheet-like light polarizing element positioned with its polarizing axis at right angles to that of the first mentioned polarizing element, a 25/2 wave retardation plate for the wavelength 5500 Å, and a third sheet-like light polarizing element positioned with its polarizing axis parallel to the axis of said first mentioned polarizing element, the principal directions of vibration of each retardation plate being approximately at 45° to the axes of said polarizing elements, said light-polarizing elements and retardation plates being positioned to overlie each other and to intercept and transmit the same incident beam of light.

5. A light filter comprising five sheet-like light polarizing elements positioned successively with their polarizing axes at right angles one to another and four birefringent retardation plates, one each of said plates being positioned between pairs of successive polarizing elements, one of said plates being an 11/2 wave plate for a predetermined wavelength in the visible spectrum, another of said plates being a 21/2 wave plate for said wavelength, another of said plates being a 15/2 wave plate for said wavelength, and the fourth of said plates being a 29/2 wave plate for said wavelength, all of said plates being positioned with their principal directions of vibration at angles of approximately 45° to the polarizing axes of said polarizing elements, all of said polarizing elements and retardation plates being positioned to overlie each other and to intercept and transmit the same incident beam of light.

6. A light filter comprising five sheet-like light polarizing elements positioned successively with their polarizing axes at right angles one to another and four birefringent retardation plates, one each of said plates being positioned between pairs of successive polarizing elements, one of said plates being an 11/2 wave plate for a predetermined wavelength in the visible spectrum, another of said plates being a 15/2 wave plate for said wavelength, another of said plates being a 21/2 wave plate for said wavelength, and the fourth of said plates being a 29/2 wave plate for said wavelength, all of said plates being positioned with their principal directions of vibration at angles of approximately 45° to the polarizing axes of said polarizing elements, means to hold said elements in superimposed position as a filter unit, and means to mount said unit for rotation about an axis traversing to the direction of propagation of light transmitted by said filter, said axis of rotation being parallel to the polarizing axis of at least one of said polarizing elements.

7. A color filter unit comprising at least three thin, sheet-like light-polarizing elements and at least two sheet-like birefringent wave-retardation elements, so positioned that polarizing elements and retardation elements alternate in said filter, said retardation elements being positioned with their principal vibration directions at predetermined acute angles to the polarizing axes of the light-polarizing elements adjacent said retardation elements, each of said retardation elements being adapted to retard differently from the others of said retardation elements transmitted plane-polarized light of a predetermined wave length, each light-polarizing element positioned adjacent the light-emitting face of any of said retardation elements being positioned to transmit plane-polarized light of a predetermined wave length traversing said retardation element, and being positioned to substantially block plane-polarized light of another predetermined wave length traversing said retardation element, and means to hold all of said polarizing and retardation elements in superimposed relation to intercept an incident beam of light.

EDWIN H. LAND.
MARTIN GRABAU.